United States Patent
Hirzel et al.

(10) Patent No.: US 10,796,088 B2
(45) Date of Patent: Oct. 6, 2020

(54) SPECIFYING A CONVERSATIONAL COMPUTER AGENT AND ITS OUTCOME WITH A GRAMMAR

(71) Applicant: International Business Machines Corporation, Armonk, NY (US)

(72) Inventors: Martin J. Hirzel, Ossining, NY (US); Louis Mandel, New York, NY (US); Avraham E. Shinnar, Hawthorne, NY (US); Jerome Simeon, New York, NY (US); Mandana Vaziri, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 15/493,436

(22) Filed: Apr. 21, 2017

(65) Prior Publication Data

US 2018/0308476 A1    Oct. 25, 2018

(51) Int. Cl.
*G10L 15/00* (2013.01)
*G06F 40/211* (2020.01)
*G06F 40/35* (2020.01)
*G06F 40/247* (2020.01)
*G06F 40/295* (2020.01)

(52) U.S. Cl.
CPC .......... *G06F 40/211* (2020.01); *G06F 40/247* (2020.01); *G06F 40/295* (2020.01); *G06F 40/35* (2020.01)

(58) Field of Classification Search
CPC ...................................................... G10L 15/00

USPC ......... 704/9, 270.1, 254, 257; 717/143, 113; 715/762, 706, 240; 709/246, 203
See application file for complete search history.

(56) References Cited

U.S. PATENT DOCUMENTS

| | | | |
|---|---|---|---|
| 6,820,135 B1 * | 11/2004 | Dingman | G06F 16/258 709/246 |
| 8,868,424 B1 * | 10/2014 | Moore | G06F 16/90332 704/270.1 |
| 9,189,742 B2 | 11/2015 | London | |
| 9,263,039 B2 | 2/2016 | Di Cristo et al. | |
| 10,552,543 B2 * | 2/2020 | Hirzel | G10L 15/22 |
| 2002/0091528 A1 * | 7/2002 | Daragosh | G10L 15/30 704/270.1 |
| 2013/0031476 A1 * | 1/2013 | Coin | G06F 40/56 715/706 |
| 2013/0232190 A1 * | 9/2013 | Miller | H04L 67/42 709/203 |

(Continued)

OTHER PUBLICATIONS

IBM, "Domain-based Evaluation Metric for Spoken Dialog Systems", ip.com, Jun. 16, 2009, 6 pages.

(Continued)

*Primary Examiner* — Michael Colucci
(74) *Attorney, Agent, or Firm* — Scully, Scott, Murphy & Presser, P.C.; Anthony R. Curro

(57) ABSTRACT

An entity grammar that specifies a computer conversational agent may be received. User utterances are interpreted based on the entity grammar and prompts for the conversational agent to pose are determined based on the entity grammar. An outcome of the dialog is built by storing words in the user utterances and the prompts that match tokens in the entity grammar. The entity grammar specifies both a dialog flow and data structure of the outcome.

20 Claims, 7 Drawing Sheets

(56) References Cited

U.S. PATENT DOCUMENTS

| | | | |
|---|---|---|---|
| 2014/0146644 A1* | 5/2014 | Chen | G08C 17/02 |
| | | | 367/197 |
| 2014/0149121 A1 | 5/2014 | Di Fabbrizio et al. | |
| 2014/0245134 A1* | 8/2014 | Portnoy | G06F 9/451 |
| | | | 715/240 |
| 2014/0282384 A1* | 9/2014 | Pamer | G06F 8/437 |
| | | | 717/113 |
| 2014/0282443 A1* | 9/2014 | Hoban | G06F 8/437 |
| | | | 717/143 |
| 2014/0297282 A1* | 10/2014 | Peters | G10L 15/19 |
| | | | 704/254 |
| 2015/0066479 A1* | 3/2015 | Pasupalak | G06F 16/9535 |
| | | | 704/9 |
| 2015/0095811 A1* | 4/2015 | Olenick | G06F 3/0484 |
| | | | 715/762 |
| 2015/0100302 A1* | 4/2015 | Flaks | H04M 3/5175 |
| | | | 704/9 |
| 2016/0357731 A1* | 12/2016 | Zorzin | G06F 40/56 |
| 2017/0116982 A1* | 4/2017 | Gelfenbeyn | G10L 15/08 |
| 2017/0118336 A1* | 4/2017 | Tapuhi | H04M 3/4938 |
| 2017/0300499 A1* | 10/2017 | Lev-Tov | G06F 40/174 |
| 2018/0173812 A1* | 6/2018 | Agarwal | G06F 16/254 |
| 2018/0308476 A1* | 10/2018 | Hirzel | G06F 40/295 |

OTHER PUBLICATIONS

Manaris, B., "Natural Language Processing: A Human-Computer Interaction Perspective", Advances in Computers (Marvin V. Zelkowitz, ed.), Oct. 1998, 55 pages, vol. 47.

Ogden, W.C., et al., "Using Natural Language Interfaces", Computing Research Laboratory New Mexico State University, May 1996, 34 pages.

Bobrow, D.G., et al, "GUS, A Frame-Driven Dialog System", Artificial Intelligence, Apr. 1977, pp. 155-173, vol. 8, Issue 2.

Bridge, D., "Towards Conversational Recommender Systems: A Dialogue Grammar Approach", Department of Computer Science, University College Cork, http://www.cs.ucc.ie/~dgb/papers/Bridge-2002.pdf, Accessed on Apr. 18, 2017, pp. 9-22.

Bringert, B., "Rapid Development of Dialogue Systems by Grammar Compilation", Department of Computer Science and Engineering, Chalmers University of Technology and University of Gothenburg, http://www.cse.chalmers.se/alumni/bringert/publ/gf-voicexml-tr/gf-voicexml-tr.pdf, Accessed on Apr. 18, 2017, pp. 1-15.

Clark, H.H., et al., "Contributing to Discourse", Cognitive Science, Apr. 1989, pp. 259-294, vol. 13, No. 2.

Denecke, M., et al., "Dialogue Strategies Guiding Users to Their Communicative Goals", European Conference on Speech Communication and Technology, Sep. 1997, 4 pages.

Fuchs, N.E., et al., "Attempto Controlled English for Knowledge Representation", Reasoning Web 2008, LNCS 5224, Sep. 2008, pp. 104-124.

Gulwani, S., et al., "NLyze: Interactive Programming by Natural Language for SpreadSheet Data Analysis and Manipulation", SIGMOD'14, Jun. 2014, pp. 12 pages.

Holland, S., "Talents in the Left Brain", Hidden Talents, 2001, http://hiddentalents.org/brain/113-left.html, Accessed on Apr. 18, 2017, 7 pages.

IBM, "Conversation", Watson Developer Cloud, https://www.ibm.com/watson/developercloud/conversation.html, Accessed on Apr. 18, 2017, 6 pages.

Jurafsky, D., et al., "Speech and Language Processing", An Introduction to Natural Language Processing, Computational Linguistics, and Speech Recognition, Second Edition, http://www.cs.colorado.edu/~martin/slp.html, Last update Jan. 6, 2009, Accessed on Apr. 18, 2017, 8 pages.

Kaplan, R., "Beyond the GUI: It's Time for a Conversational User Interface", Wired, https://www.wired.com/2013/03/conversational-user-interface/, Mar. 21, 2013, Accessed on Apr. 18, 2017, 6 pages.

Kuhn, T., "A Survey and Classification of Controlled Natural Languages", Computational Linguistics, Accepted for Publication Apr. 25, 2013, pp. 1-50.

Liu, C.W., et al., "How NOT to Evaluate Your Dialogue System: An Empirical Study of Unsupervised Evaluation Metrics for Dialogue Response Generation", Cornell University Library, https://arxiv.org/pdf/1603.08023.pdf, Last revised Jan. 2017, Accessed on Apr. 18, 2017, 15 pages.

Lucas, B., "VoiceXML for Web-Based Distributed Conversational Applications", Communications of the ACM, Sep. 2000, pp. 53-57, vol. 43, No. 9.

McTear, M.F., "Spoken Dialogue Technology: Enabling the Conversational Interface", ACM Computing Surveys, Mar. 2002, pp. 90-169, vol. 34, No. 1.

Ranta, A., "Grammatical Framework Programming with Multilingual Grammars With a Special Focus on Chinese", http://www.grammaticalframework.org/~aarne/gf-guangzhou.pdf, Sep. 23-27, 2013, Accessed on Apr. 18, 2017, 66 pages.

Walker, M.A., et al., "PARADISE: A Framework for Evaluating Spoken Dialogue Agents", Proceedings of the 35th Annual Meeting of the Association for Computational Linguistics, Apr. 1997, Cornell University Library, https://arxiv.org/abs/cmp-lg/9704004, Accessed on Apr. 18, 2017, 11 pages.

Williams, J.D., et al., "Rapidly scaling dialog systems with interactive learning", Natural Language Dialog Systems and Intelligent Assistants (2015), https://pdfs.semanticscholar.org/095f/f951f0ac801310f10208adb838204d4b17bb.pdf, Semantic Scholar, Accessed on Apr. 18, 2017, pp. 1-12.

GF, "Grammatical Framework", http://www.grammaticalframework.org, Accessed on Apr. 20, 2017, 4 pages.

* cited by examiner

SPECIFYING A CONVERSATIONAL COMPUTER AGENT AND ITS OUTCOME WITH A GRAMMAR

FIELD

The present application relates generally to computers and computer applications, and more particularly to computer-human conversational agents and authoring systems for conversational agents that allow natural language dialogs between humans and computers.

BACKGROUND

When humans can converse with computers using natural language, computers can assist them in real-life situations where traditional human-computer interfaces are cumbersome. Recent advances in natural language processing paved the way to bring conversational human-computer interfaces to the mainstream. However, facilities for authoring such interfaces are lagging behind. It is not easy to program a robust yet powerful human-computer dialog.

Prior approaches for specifying human-computer dialogs include the finite-state approach and the frame-based approach. In the finite-state approach, dialog control is determined by an explicitly-specified directed graph, whereas in the frame-based approach, the dialog is driven by filling slots in a form. However, those approaches may not provide coherence and flexibility, which are desirable in computer-implemented conversational agents or interfaces.

BRIEF SUMMARY

A method and system of providing a computer conversational agent and an outcome may be provided. The method, in one aspect, may include receiving an entity grammar specifying the computer conversational agent, the entity grammar comprising rules that define compound entities in terms of tokens, choice, and product and according to which the computer conversational agent is to conduct a dialog with a user. The method may also include receiving a user utterance. The method may further include interpreting the user utterance based on the entity grammar. The method may also include determining a prompt for the computer conversational agent to pose to the user based on interpreting the user utterance and the entity grammar. The method may further include uttering the prompt to the user. The method may also include building the outcome by storing words in the user utterance and the prompt that match the tokens in the entity grammar. The method may also include repeating the receiving of user utterance, the determining of a prompt, the uttering of the prompt and the building of the outcome until the dialog ends, the end of the dialog determined based on the grammar. The entity grammar may specify both a dialog flow of the dialog and data structure of the outcome.

A computer conversational agent system, in one aspect, may include a memory device and at least one hardware processor coupled to the memory device. The at least one hardware processor may receive an entity grammar specifying the computer conversational agent, the entity grammar comprising rules that define compound entities in terms of tokens, choice, and product, and according to which the computer conversational agent is to conduct a dialog with a user. The at least one hardware processor may receive user utterance and interpret the user utterance based on the entity grammar. The at least one hardware processor may determine a prompt for the computer conversational agent to pose to the user based on interpreting the user utterance and the entity grammar. The at least one hardware processor may utter the prompt to the user. The at least one hardware processor may build a dialog outcome by storing on the memory device, words in the user utterance and the prompt that match the tokens in the entity grammar. The at least one hardware processor may repeat the receiving of user utterance, the determining of a prompt, the uttering of the prompt and the building of the dialog outcome until the dialog ends, the end of the dialog determined based on the grammar. The entity grammar may specify both a dialog flow of the dialog and data structure of the dialog outcome.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
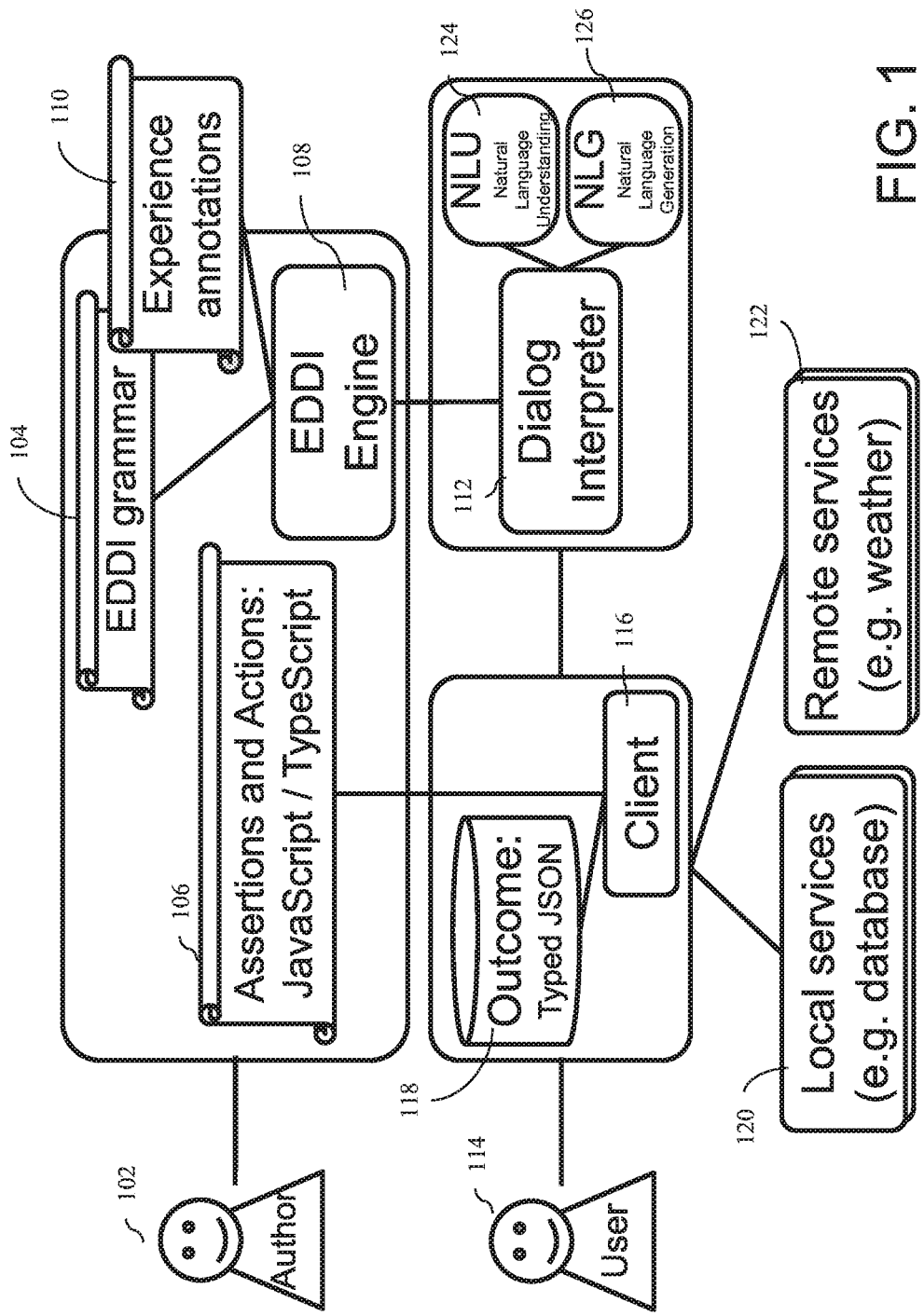
FIG. 1 is a diagram showing architectural components of an entity-driven dialog interpreter (EDDI) system in one embodiment of the present invention.

A computer or robot's ability to carry a range of conversations with humans or interact with humans in natural language dialogs has been explored. Early dialog systems focused on travel, where a human who is away from home can use a voice phone to book, for instance, flights. Recently, human-computer dialog systems, also known as chat bots or virtual agents, are receiving renewed attention. Devices such as cars, thermostats, or watches that are increasingly becoming "smart" can incorporate such chat bots or conversational agents, for example, reducing the need for large displays on the devices for interaction via graphical user interfaces. Even on laptops or phones with adequate displays, one may not always want graphical interfaces with many screens and clicks. For instance, when using a messaging platform, it can be preferable to interact on the messaging platform itself with bots, rather than context-switching to a different application. Such integrated interaction also may benefit from other messaging features such as history. Moreover, when computers understand the way humans speak, humans need not adopt a form of "machine-speak".

Services are becoming available that allow users or customers to author and run their own chat bots. For instance, existing websites, messaging platforms, or mobile apps may be augmented with a conversational interface. A conversation interface may also be used for dialogs with robots.

When automated cognitive assistants become rich in features and reason in human concepts, they will eventually reach an inflection point where non-conversational interfaces no longer suffice to interact with them. Speech oriented natural-language interfaces make computing technologies more accessible to the population, for example, including in circumstances that prevent using graphical user interfaces, such as in the dark, or in hands-free environment.

A system, method and techniques for authoring of conversational agents may be provided. Conversational agents refer to computer programs or modules that conduct natural-language dialogs with human users. In one aspect, the authoring in the present disclosure provides for coherency (focusing on common ground and being goal-directed), while providing flexibility (for example, being adaptive and natural with a mixed-initiative capability).

The system in one embodiment may generate a dialog flow which can take user utterances as input, interact with the user and guide the construction of the output. In one embodiment, a programming model may be implemented, via which developers may specify human-computer dialogs. The programming model implements grammars, for example, to specify parsers along with their outcomes and to author a dialog that imposes structure over a linear sequence of inputs. The system and method in one embodiment may treat entire utterances by the human in a dialog as individual tokens in a grammar.

For example, a user may specify human-computer conversational agents via a formal grammar. A conversational agent in one aspect is a computer program, and as thus, is specified (programmed or implemented) via a programming language. A methodology in the present disclosure in one embodiment uses a form of grammars as the domain-specific programming language for specifying conversational agents. Grammar rules define both the result of the conversation, through compound entities such as tokens, choice, and product. A dialog interpreter processes use utterances, using the grammar to determine conversation prompts. The dialog interpreter constructs a result, whose data structure is specified by the same grammar. In one aspect, only one grammar is used that states information once. A developer may write one grammar that describes vocabulary and relationships for the application and structure of the output. Each name in the grammar serves to generate basic prompts, for example, help, result field names, confirmation. In another aspect, the semantics do not narrowly prescribe items that the dialog interpreter may autonomously want to optimize, such as prompting order, how explicit or implicit confirmation is. For example, the dialog interpreter (or like engine) may be free to autonomously decide on and/or optimize a conversation flow. Yet in another aspect, if there are external actions or assertions, they may be explicitly called from insider the grammar. For example, a conversation flow may be specified all through grammar, optionally including any actions or assertions within the grammar. The dialog interpreter in one aspect may leverage traditional programming language design principles such as compositionality, orthogonality, familiarity, and modularity. In general, there may be a plurality of approaches for executing programs written in a programming language. One approach is to use an interpreter for the language, which understands the language directly. In an interpreter-based embodiment in the present disclosure, a dialog interpreter directly understands and executes the dialog grammar. Another approach is to use a compiler to compile from the language to another, e.g., lower-level language. In a compiler-based embodiment in the present disclosure, a compiler is used to compile from the dialog grammar to the language of an existing dialog interpreter (for instance, the language of WCS).

In one embodiment, the partial result is represented via a data structure, for example, JSON data structure. The behavior of the conversational agent may depend on previous conversations, for example, providing for adaptation.

FIG. 1 is a diagram showing architectural components of an entity-driven dialog interpreter (EDDI) system in one embodiment of the present disclosure. The EDDI system may be implemented on top of platforms such as Watson Conversation Service (WCS) platform from International Business Machine Corporation (IBM®), Armonk, N.Y. In EDDI of the present disclosure, the grammar specifies primitive and compound entities, which constitute the outcome of the conversation, and which also drive the dialog flow.

An author 102 specifies an EDDI grammar 104 and assertions and actions 106. A hardware processor, for example, that is implementing or executing an EDDI engine 108, receives the grammar 104 and assertions and actions 106. Assertions and actions 106 include functions that can be called by the grammar. Those functions may be implemented in a traditional programming language such as JavaScript or TypeScript. The EDDI engine 108 may receive the grammar, and assertions and actions specifications in a form of a computer file, as an example.

An example grammar is shown below:

```
pizza: size topping*;
size: "small" / "individual" | "medium" | "large"
topping: "mushrooms" | "pepperoni" / "salami" | "cheese"
```

Finite state machines (automata) may be used to implement the EDDI grammar. In one embodiment, a grammar in the present disclosure may purposely leave one or more aspects underspecified, such as the order in which slots of a product are filled. Such grammar may be optionally augmented with experience annotations 110 that provide hints for making those underspecified aspects (e.g., like the order) more specific. The EDDI engine 108 understands the grammar 104 and experience annotations 110 and transforms the grammar 104 into a lower-level dialog flow to be executed by a dialog interpreter 112.

A user 114 may be the human who has a conversation with the conversational agent of the present disclosure in one embodiment. A client 116 may include an application executing on a hardware processor, for example. The application may be a stand-alone application on a laptop or a mobile phone, or an application running in a web browser, or embodied in a robot, or a web application, and may be operated by an organization that offers a chat bot.

The user 114 talks to a client 116, and the client 116 maintains state in the form of the outcome 118, which can be typed JavaScript Object Notation (JSON). The outcome 118 may be stored in a storage or memory device. The client 116 runs assertions and actions 106 called by the grammar 104, and the client 116 makes service calls, for example, locally (for instance, a database of the organization) 120 or remotely (for instance, a weather service) 122.

A dialog interpreter 112, natural language understanding (NLU) 124 and natural language generation (NLG) 126 modules may be provided by the WCS or like platform, which may run on one or more hardware processors. The dialog interpreter 112 is driven by a lower-level dialog specification, for instance, based on finite-state machines, technology used in conversational agents. The EDDI engine 108 of the present disclosure transforms the grammar 104 into this lower-level formalism. For example, the "choice" feature in a grammar may be transformed into a finite state machine where several transitions originate from the same state, one for each alternative of the choice. As another example, the "product" feature in a grammar may be transformed into a finite state machine that has a chain or states, where each transition corresponds to one slot. The NLU 124 may be used to analyze user utterances. In the present disclosure in one embodiment, confirmation and repair capabilities may be augmented with NLU functionality. For example, NLU may misunderstand "mega-sized" as "medium". The computer may then confirm its understanding of "medium" with the human. Responsive to the human rejecting that understanding, the computer initiates additional conversational turns that repair the misunderstanding. Natural language synthesis techniques may be used to generate system responses in natural language.

In one embodiment, the runtime execution is split between the client 116 (which maintains state, executes assertions and actions 106, and calls one or more services (e.g., 120, 122)), and the generic dialog service 112 (which interprets the dialog specification derived from the grammar 104 and handles NLU 124 and NLG 126). This separation allows for scaling, resilience, and access control in systems that implement conversational agents. For instance, the conversational agent service can scale to more users and be more resilient by not maintaining state. The client has the appropriate access privileges to call local services of the organization that hosts the conversational agent.

An example conversation is shown below (referred to as Example Dialog 1):
C: Welcome to the pizza dialogue! What would you like?
H: A salami and mushrooms pizza.
C: Okay, salami and mushrooms. Any other toppings?
H: No thanks.
C: What size?
H: What are my choices?
C: Small, medium, or large.
H: Medium please.
C: Okay, medium.

The user (e.g., the persona denoted "H" in the pizza dialog transcript example above) 114 may conduct a conversation with a computer, the conversational agent denoted "C" in the pizza dialog transcript example above, via the client 116. The local services (e.g., 120), for instance, may be the company that sells pizza in this dialog example.

Referring to "C: Welcome to the pizza dialogue! What would you like?" dialog piece in the above example, at the start of the conversation, the computer (C) mentions "pizza", which is the non-terminal that serves as the start symbol of the grammar.

Referring to "H: A salami and mushrooms pizza" dialog piece in the above example, the NLU (natural language understander) 124 extracts two tokens that it knows from the grammar: "salami" and "mushrooms".

Referring to "C: Okay, salami and mushrooms. Any other toppings?" dialog piece in the above example, the computer realized that the tokens it received from the NLU 124 are listed under the "topping" non-terminal. It echoes them back to the human to establish common ground. Since the pizza has a repetition "topping*" marked with a Kleene star (*), the computer asks whether the list of toppings should have any more elements.

Referring to "H: No thanks" dialog piece in the above example, at this point, the user 114 is given an opportunity to reject the toppings. Since there is no rejection, the computer can safely assume that the "salami" and "mushrooms" are confirmed. Furthermore, the user 114 indicates that there are no other toppings. For example, the computer knows that toppings are a list, so it asks "any more toppings?". When the user replies "no thanks", the computer knows that the list is complete, since the user does not want more toppings.

Referring to "C: What size?" dialog piece in the above example, the part of the dialog pertaining to the toppings is done, and the user 114 did not seize the initiative to steer the conversation. For instance, the computer detects that the token "size" under the non-terminal "pizza" still needs to be filled. Therefore, the computer initiates a part of the dialog pertaining to the size, which is the other missing slot in the top-level pizza grammar.

Referring to "H: What are my choices?" dialog piece in the above example, instead of answering the question about the size, the user 114 initiates an insertion sequence, asking for help.

Referring to "C: Small, medium, or large" dialog piece in the above example, the computer can answer the help request based on the grammar rule with size choices. This illustrates that the same grammar rule is used for multiple purposes: understanding the user 114, guiding the dialog flow, and providing help text.

Referring to "H: Medium please" dialog piece in the above example, now that the user 114 knows the available choices, the user picks one of the offered alternatives.

Referring to "C: Okay, medium" dialog piece in the above example, the computer again echoes back what it heard from the user to establish common ground. At this point, the computer has built a complete outcome according to the grammar. This outcome could be rendered for instance in JSON (JavaScript Object Notation) format as follows:

```
{ pizza:
  { size : "medium",
    toppings: [
    "salami",
    "mushrooms" ] } }
```

In this outcome, the field names (pizza, size, toppings) are derived from non-terminals in the grammar. The field values (medium, salami, mushrooms) are derived from synonyms in the grammar. In the dialog, the user provides the actual field values, which are extracted via NLU, and which are associated to field names based on the current status of the outcome and the conversation.

Table 1 illustrates grammar features in one embodiment.

| Name | Example | Description |
| --- | --- | --- |
| Rule | size: "small" \| "large"; | Define composite entity |
| Choice | "small" \| "large" | Alternatives to pick from |
| Product | size toppings | Slots to fill in |
| Sequence | authenticate, edit | Enforce ordering |
| List | topping* | Zero, one, or multiple |
| Option | fries? | Zero or one |
| Synonyms | "small"/"individual" | Intents or values of entities |
| Pattern | /0\|[1-9][0-9]+/ | E.g., number, time, . . . |
| Alias | from "departure airport": airport; | Alternative name for non-terminal, can include spaces |
| Assertion | &{differ(from, to)} | Call semantic predicate (fire when arguments filled) |

| Name | Example | Description |
|---|---|---|
| Action | {code = book(from, to);} | Call procedure (fire when arguments confirmed) |

Each row in Table 1 is one grammar feature and shows a name, an example, and a description for each grammar feature. A rule is written as 'non-terminal: (right-hand side);'. The non-terminal is a name that can be understood from human utterances; can be prompted to the user when the computer has the initiative or for help; and also serves as a name for a part of the outcome. The right-hand side of a rule is composed using the other grammar features listed in subsequent rows of the table.

A choice provides alternatives for the human to pick from. It is a disjunction: it can be filled with the first alternative, or the second alternative, or another alternative, or the last alternative. While the example shows simple values as alternatives, in general, the alternatives can use any of the other grammar features.

A product provides slots for the human to fill in. It is a conjunction: the user provides the first slot, the second slot, and so on, and the last slot. While the example shows non-terminals as slots, in general, the slots can use any of the other grammar features. The order in which the dialog flow fills in the slots is flexible. Both the human and the computer can deviate from the order specified in the grammar.

A sequence is similar to a product in that it provides slots for the user to fill in, as a conjunction of other grammar features. However, it restricts the order in which the dialog flow fills in the slots to be the same order in which the slots are listed in the grammar.

A list indicates a repetition of possibly multiple elements. The dialog flow determines which elements go in the list, and when the list is considered complete. In the example, the list is rendered with a star (*) indicating zero or more elements. It may also be rendered with a plus (+) symbol to indicate one or more elements. Any other symbols may be utilized to indicate zero or more elements.

An option indicates that a particular element in the grammar is optional. It can be present (one element) or absent (zero elements).

Synonyms specify individual values for tokens via examples for the NLU (natural language understander). This grammar feature is novel for use in conversational agents. Each synonym is rendered as a literal quoted string. There are different implementation choices for detecting synonyms in the NLU. The NLU can detect synonyms when they occur verbatim in a human utterance; or the NLU can perform a kind of fuzzy match, for instance, using stemming or edit distance; or the NLU can use the examples to train a natural-language classifier via machine-learning algorithms such as naive Bayes, support vector machines, or neural networks.

A pattern specifies tokens that the author of the grammar does not want to exhaustively enumerate. A simple embodiment for patterns may use regular expressions, a known formalism for matching on strings. Patterns are useful, for instance, for numbers, using a regular expression such as /0|[1-9][0-9]+/.

An alias provides an alternative way to refer to a non-terminal. It serves to train the NLU to understand when the user mentions a non-terminal in their utterance, for instance, to pick an alternative in a choice.

An assertion calls a semantic predicate, which is a function that returns a Boolean value (true or false). If the predicate returns true, the dialog flow proceeds as usual, but if it returns false, it signals the need for repair. The assertion fires when its arguments are filled (see "entity states" in FIG. 2). In the example, it would fire as soon as the human has provided both the "from" and the "to" slots. The example is taken from a travel reservation system, where the origin and the destination must not be the same. If they are the same, then "differ" returns false, the assertion fails, and the computer reports an error and asks the human to change their selections for the airports.

An action calls a procedure, which is a function with a side-effect. The side-effect can be to call an external service or to set a variable. In the example, both side-effects are present: "book" does a travel booking via an external service call, and the resulting confirmation number is written to variable "code". The action fires when all its parameters are confirmed (see "entity states" in FIG. 2). In particular, that implies that assertions must pass before actions can get taken. This design choice increases the safety and trustworthiness of the conversational agent.

Figure 2:
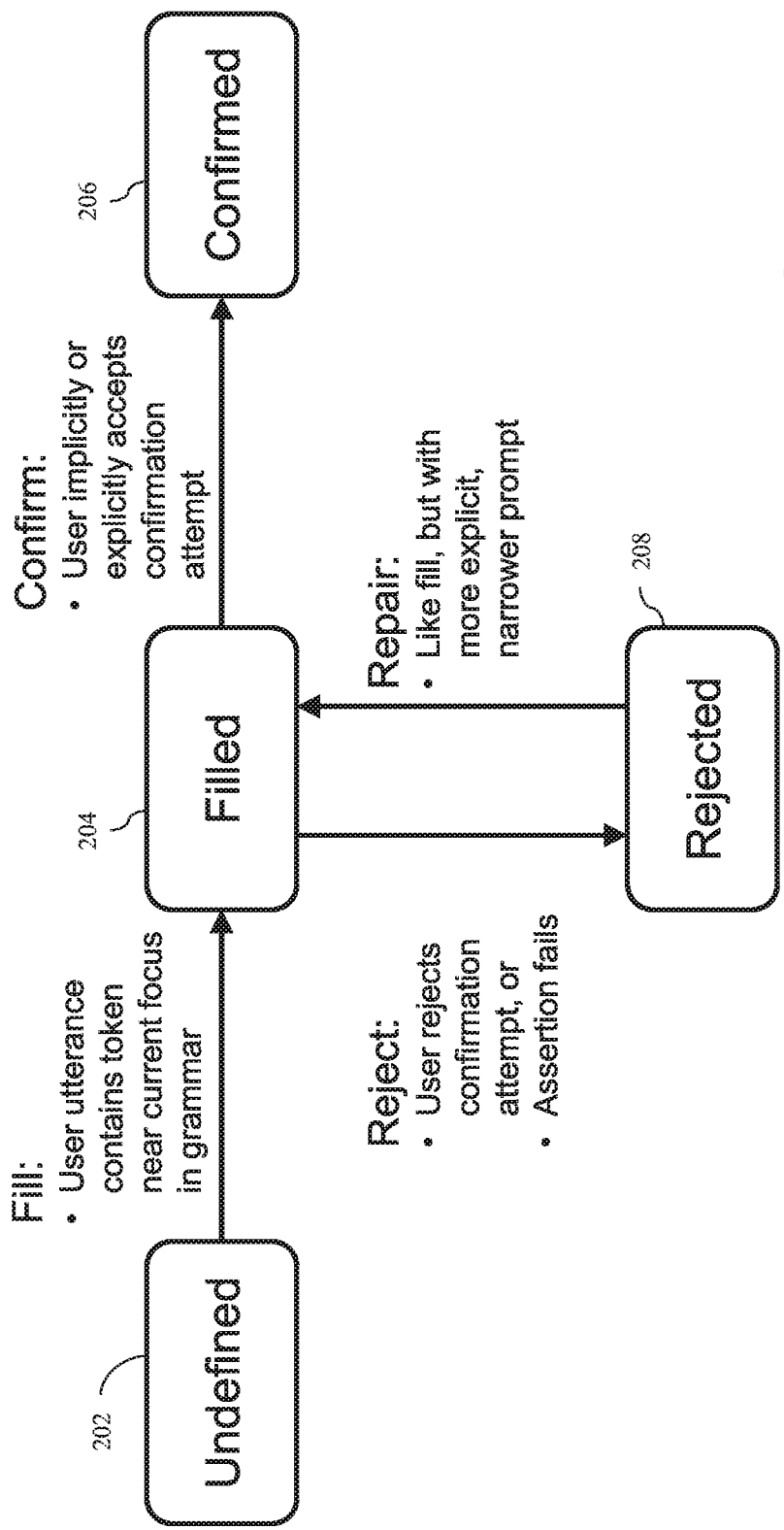
FIG. 2 shows entity states, an outcome coherence state machine in one embodiment of the present invention.

FIG. 2 shows entity states, an outcome coherence state machine in one embodiment of the present disclosure. In one embodiment, each piece of the outcome data structure is subjected to the state machine shown in FIG. 2. For example, from an undefined state 202, when NLU extracts an intent or entity, the intent or entity can be used to fill a slot, and proceed to a filled state 204. For example, user utterance contains token near current focus in grammar, and the token fills a slot in grammar. However, being merely filled is not enough. The computer gives the user an opportunity to confirm or reject a slot before it considers it part of the common ground. A confirmed state 206 is reached, for example, if the user implicitly or explicitly accepts confirmation attempt. A rejected state 208 is reached if the user rejects confirmation attempt or an assertion fails. From the rejected state 208, repair action may be performed to reach the filled state 204. For flexibility, the system of the present disclosure may allow users to take the initiative when they want to. An initiative, for example, belongs to whoever contributes the first part of a conversational adjacency pair. The state machine is used to parse and verify the grammar. For example, the dialog with the chat bot constructs an outcome (e.g., 118 in FIG. 1). At the beginning of the dialog, the outcome is empty; during the dialog, the outcome is partially complete and partially empty; and when the dialog concludes, the outcome is fully complete. In one aspect, the outcome can be viewed as a tree, where every node in that tree corresponds to a piece of information collected from the user. For example, "medium" may be a leaf node under the "size" node. Every node in the tree is subject to the state machine in FIG. 2. Most of the dialog is directed at moving nodes from undefined (the undefined state at 202) to filled (the filled state at 204) and from filled (the filled state at 204) to confirmed (the confirmed state 206). In the scenarios when the user rejects an utterance, the dialog switches into repair mode (e.g., via the rejected state at 208) to get the corresponding node filled correctly.

Figure 3:
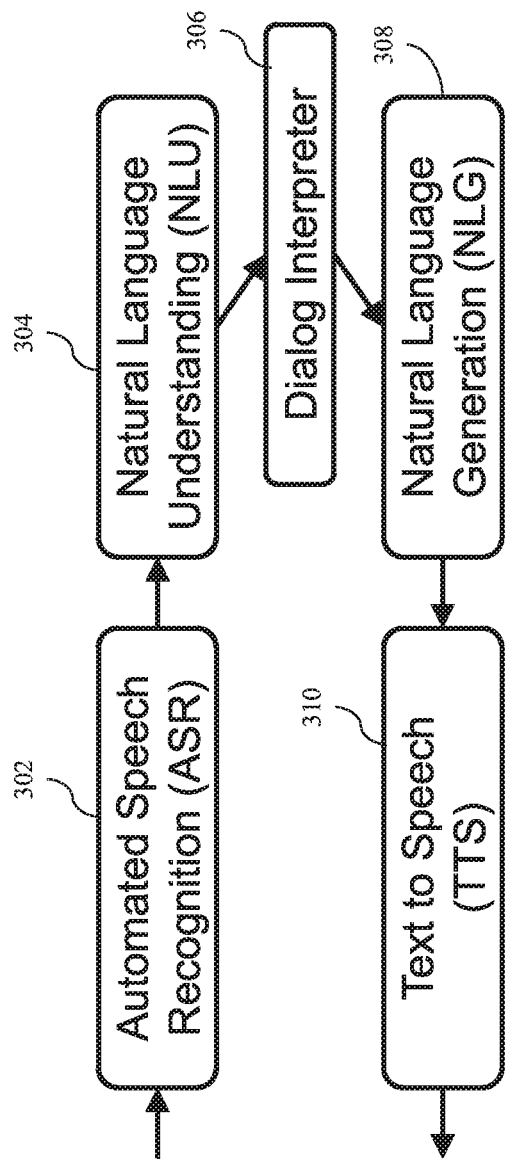
FIG. 3 shows a simplified architecture for conversational agents or chat bots.

FIG. 3 shows a simplified architecture for conversational agents or chat bots. Human speech is converted to text, by an automated speech recognition technique 302, and an NLU 304 extracts relevant inputs for the dialog interpreter 306. Symmetrically, the outputs from the dialog interpreter 306 get converted to text 308, and then synthesized back to speech 310. If the human interacts at the textual level, the speech components can be omitted from the architecture.

While the NLU may understand parts-of-speech, NLU may extract intents and entities from the human utterance. An intent may specify an action, for example, "turn on radio", and an entity may specify an item, for example, "jazz music". For example, intents can be detected via machine-learning classifiers, and entities via pattern-matching. Intents and entities extracted, for example, by an NLU from user's utterances, may be subject to the states of a state machine shown in FIG. 2.

Figure 4:
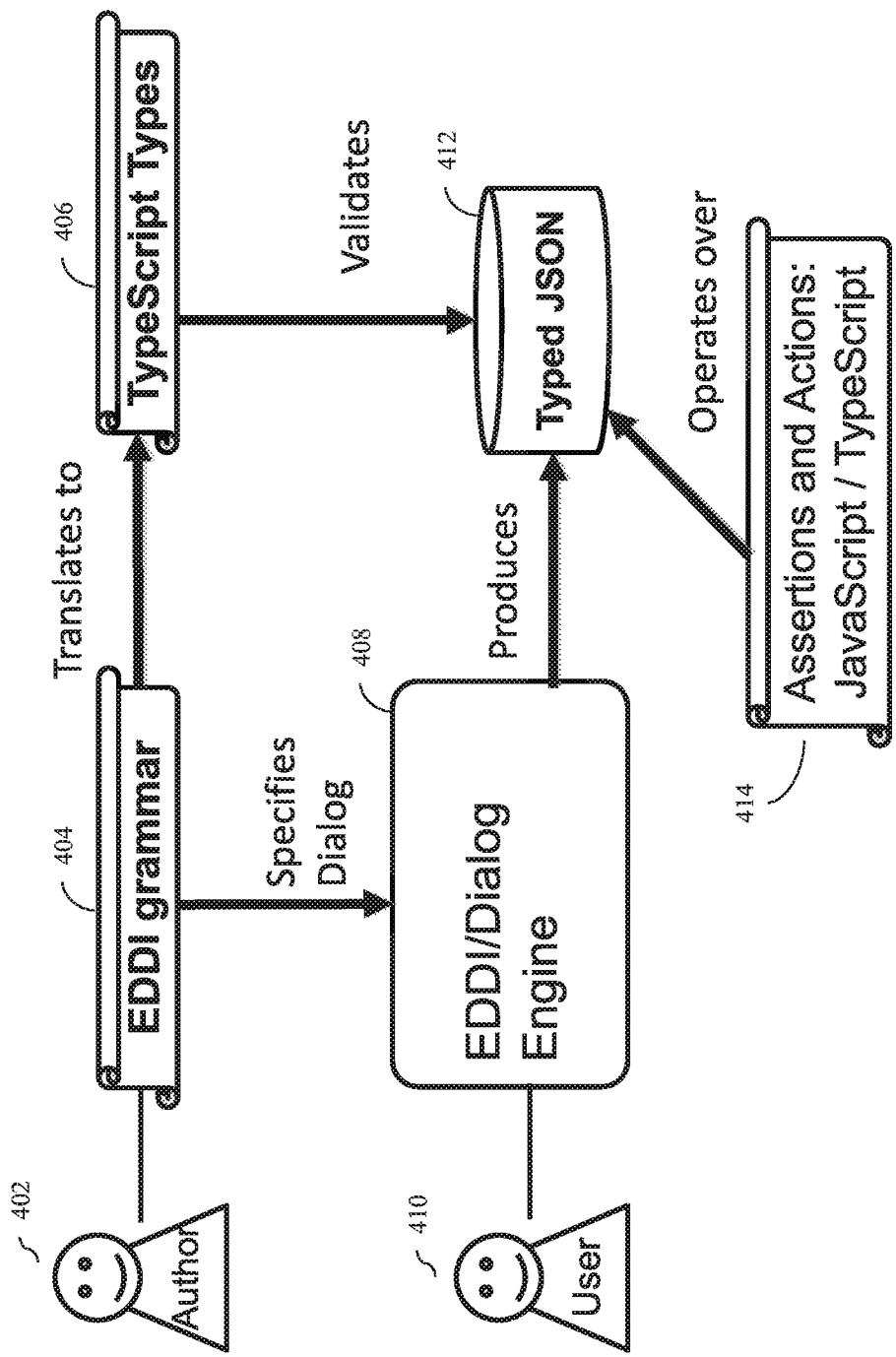
FIG. 4 is a diagram illustrating a dual role performed by a single grammar in one embodiment of the present invention.

FIG. 4 is a diagram illustrating a dual role performed by a single grammar in one embodiment of the present disclosure. An author 402, for example, may specify an EDDI grammar 404. The EDDI grammar 404 is received and an engine or processor in one embodiment of the present disclosure may translate the grammar 402 into a set of types 406. A dialog engine 408 converses with a user 410, according to the specified grammar 404, and produces an outcome data structure, for example, in typed JSON 412. Assertions and actions 414 are executed based on, or operate over, the outcome 412.

In the present disclosure in one embodiment, a single grammar specifies both the dialog flow of a conversational agent as well as its outcome. FIG. 4 shows that dual role. For example, the author 402 writes the grammar 404. The grammar specifies the dialog flow for the EDDI dialog engine 408 (e.g., also shown at 108 in FIG. 1). The flow includes guiding the user 410 through providing all the information required by the grammar during the dialog. While the dialog is in progress, this information is partial, since some slots may not yet be filled in. When the outcome is complete, the dialog concludes. The dialog engine 408 produces a typed JSON representation 412 of the outcome (e.g., also shown at 118 in FIG. 1).

The same EDDI grammar 404 can also be automatically translated into a set of types 406. In one embodiment, each grammar production is transformed into one TypeScript type. The types 406 validate the outcome 412. For example, a valid outcome is a JSON document that adheres to the types. Producing a valid JSON can be seen as a measure of success of the dialog.

Once complete, the typed JSON outcome serves to accomplish the user's goal, typically by making a call to an external service with a side effect. For instance, this call may order a pizza or book an airplane trip. In one embodiment, these calls are executed via actions 414, and the complete typed JSON document is passed as an argument to these actions. Similarly, during the course of the conversation, preliminary incomplete versions of the JSON document are passed to assertions 414 as specified by the grammar to enforce any additional constraints not handled by the type system.

The programming model utilizing grammars in one embodiment of the present disclosure fulfill the requirements for conversational agents. For example, via the grammar, the agent may conduct a linear sequence of interactions with a human over time, at the granularity of utterances in a conversation. From this sequence of interactions, the agent constructs an outcome that adheres to a known type. The agent also may detect and fix misunderstandings and allow the human to go off-script by grabbing the initiative where appropriate. In one aspect, the programming model is easy to learn, and can reuse programming-language concepts. Grammars specify parsers that process a linear sequence of tokens, produce an outcome, and can be made robust to kinds of errors. The programming model of the present disclosure allows for the outcome of a conversation to get transformed into a command or query for another system, which is itself also characterized by a grammar.

In one embodiment of the present disclosure, a token is considered an entire utterance by a human. Grammars in the present disclosure specify the dialog interpreter, not for example other components such as the NLU. The grammar in the present disclosure in one aspect is different from those that serve the role of the grammar for natural language, which recognizes phrases and parts of speech within a sentence. For example, a chat-bot may function as a parser for its human interlocutor, and the NLU component may function as a lexer that extracts tokens in the form of intents and entities from human utterances.

Referring to the above example pizza grammar, grammars may be represented with non-terminals (e.g., pizza), repetition (*), choice (|), and products (e.g., size topping*). Another grammar feature is synonyms (/), for instance, "small"/"individual". Synonyms may be viewed as samples for NLU tokens, and may or may not be taken literally, based on implementation. For instance, synonyms may serve as training inputs for a machine-learning classifier.

Figure 5:
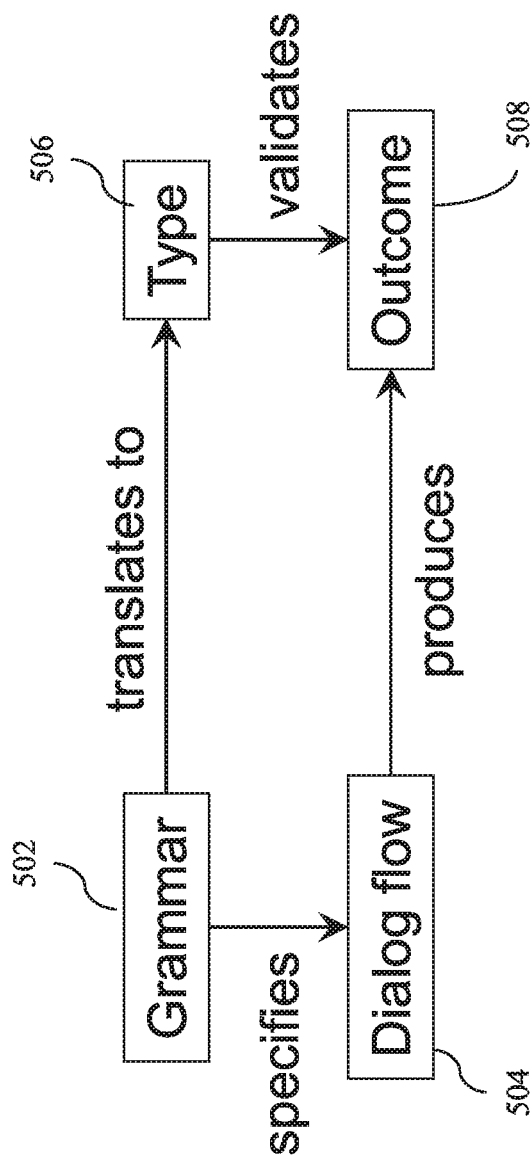
FIG. 5 is another diagram illustrating dual functions of a single grammar in one embodiment of the present invention.

A single grammar such as the above example pizza grammar specifies both the flow of the conversation and the type of its outcome. FIG. 5 is another diagram illustrating dual functions of a single grammar in one embodiment of the present disclosure. The grammar 502 specifies the dialog flow 504. When the dialog interpreter uses the grammar 502 to implement the dialog flow 504, it produces an outcome 508. For instance, this outcome may be a JSON document. A translator may be implemented to translate dialog grammars to a set of types 506, for example, TypeScript types that validate the final outcome 508. A coherent dialog yields a valid outcome, but a flexible dialog populates it in the order and style preferred by the human user.

In the present disclosure in one embodiment, grammars or types specify dialogs, for example, a grammar specifies a chat bot itself. In one embodiment, types in the present disclosure specify the entire dialog flow and validate its outcome.

The following shows a Backus-Naur form (BNF) notation for EDDI grammar describing the syntax of the grammar in one embodiment.

```
eddi      ::= rule*
rule      ::= identifier synonyms? ':' term ';'
term      ::= synonyms ('|' synonyms)*
            | identifier ('|' identifier)+
            | factor (',' ? factor)*
synonyms  ::= string ('/' string)*
factor    ::= identifier ('*' | '?')? | action | assert
action    ::= '{' code '}'
assert    ::= '&' '{' code '}'
identifier::= [a-zA-Z_]+
string    ::= ' " ' ['"]+ ' " '
```

The following shows another example grammar (referred to as Example Dialog 2) (e.g., extension of the above pizza example shown in Example Dialog 1) and an example conversation conducted according to the example grammar.

pizza : size topping* crust;
size : "small"/"individual" | "medium" | "large";
topping: "mushrooms" | "pepperoni"/"salami" | "cheese";
crust : "thick" | "thin";
C: What size?
H: Mega-sized!
C: Okay, medium. What crust?

```
H: Uhm, I didn't say medium.
C: Okay, correcting the size. The choices are small, medium, or large.
What size?
H: Large.
C: You picked large size. Is that correct?
H: Yes.
C: What crust?
```

The above example conversation includes the computer correcting itself, for example, with respect to the size.

The following shows an example outcome, a JSON output from conducting a dialog.

```
{ pizza:
    { size : "large",
      toppings: ["pepperoni","cheese"],
      crust: "thin" } }
```

The following shows an example of a set of types, for example, TypeScript Type.

```
interface TOP { pizza: PIZZA; }
interface PIZZA
    { size: SIZE; toppings: TOPPING[ ]; crust: CRUST; }
type SIZE = "small" | "medium" | "large";
type TOPPING = "mushrooms" | "pepperoni" | "cheese";
type CRUST = "thick" | "thin";
```

In one embodiment, a dialog engine (or for example, a chat bot), may adapt to different phrasings, for instance, by gathering additional synonyms from confirmation dialog, or from a trained classifier. Confusions may be avoided by utilizing narrow prompts and/or explicit confirmation mechanism. If a user preferred order is detected, the computer may prompt dialogs in that order. A highly-biased choice is a choice (denoted by "|" in the grammar) where in most concrete dialogs the user picks the same alternative. For highly-biased choice, the computer may offer default answer with yes or no prompt. These features allow the computer to learn from a set of dialogs it has had, to do a better job at the next dialog. In one embodiment, this learning is recorded in the experience annotations shown at 110 in FIG. 1.

Use cases for human-computer dialogs are found in variety of domains, from travel to retail, entertainment to medical to automotive to technology trouble-shooting, and beyond. While dialogs in each of these domains look very different, the dialog authoring in the present disclosure capture common patterns in them, identifying a catalog of flow patterns for bots. The catalog maps out the terrain, gives structure, and establishes terminology. In the present disclosure, for example, the goal-driven patterns relate to coherency and desirable outcomes (118 in FIG. 1), and the add-on patterns relate to flexibility and repair (e.g., shown in FIG. 2).

A flow pattern is an interaction of a few back-and-forth turns in a dialog that either has a single well-defined outcome or handles a single deviation from the primary purpose of the bot. The outcome of a conversation may be treated as a data structure that can serve as a parameter to an external service call or as a record of what happened in the conversation. The outcome data structure fits the type for all conversations by that particular (part of a) bot. A flow pattern is finer-grained and lower-level than a use case, which captures an entire conversational agent for a particular purpose that may involve several flow patterns. Flow patterns are domain-independent and may occur across many use cases in many domains.

In one aspect, there may be two kinds of flow patterns: outcome-driven patterns, where the back-and-forth of conversation is directed at producing an agreed-upon outcome, and add-on patterns, which can occur during outcome-driven patterns but delay or possibly even derail the outcome. A set of flow patterns may include the following.

Outcome-driven flow patterns: Question answering, command and control, form filling, diagnosis, problem resolution, query formulation.

Add-on flow patterns: Anaphora and ellipsis, repair, disambiguation, elaboration, stopping a discussion, digression, interleaved dialogs.

Each of these patterns is described below with definitions and discussions as well as example dialogs between a human (H) and a computer (C) and for the outcome driven patterns. Beyond this basic list, one can also consider bot features such as chit-chat, augmenting the bot with multi-modal input, vision, or touch, or making it empathetic by detecting and appropriately responding to the emotions of the human.

Outcome driven flow patterns.

Question-answering flow pattern refers to a pattern that automatically answers questions posed by human in natural language based on a corpus of documents. The following illustrates an example question-answering flow pattern in hotel concierge use-case.

H: Where is the gift shop?
C: In the front lobby near the elevator.

Command-and-control flow pattern refers to a pattern used in controlling a device through voice or natural language (e.g., radio, phone, thermostat, coffee machine, wheelchair). The conversation start may be detected by anthropomorphizing the bot with a name such as "Olli" in the example. This type of dialog may include integrating with a device, for example, calling out from the dialog to external service code, to actuate or activate an action on or control the device. The following dialog is an example of a command-and-control flow pattern in car dashboard use-case.

H: Olli, play some jazz music.
C: Okay, playing WBGO Jazz 88.3 FM.

Form-filling flow pattern refers to a pattern in which, for each slot in a form, the conversation includes asking the human for the information to fill the slot. The dialog should catch mistakes without being too pedantic. In this type of dialog, the human may be allowed to control the order in which slots get filled. A single human utterance may contain multiple pieces of information in this flow pattern. The following illustrates an example of a form-filling flow pattern in pizza-ordering use case.

C: Welcome to the pizza dialog! What would you like?
H: A salami and mushrooms pizza.
C: Okay, salami and mushrooms. Any other toppings?
H: No thanks.
C: What size?
H: Medium, please.

Diagnosis flow pattern includes a conversation pattern that asks the human diagnostic questions following a decision tree to reach a leaf with a classification. In this type of dialog, the human may retract an earlier answer, either because they were uncertain or because they want to explore alternatives, thus requiring the bot to back-track. In another aspect, in this type of dialog, questions posed by the computer may be hand-crafted and may not be derived from the name of a field in the outcome. The following illustrates an example of a diagnosis flow pattern in medical use case.
C: What's your temperature?
H: 100.5 degrees Fahrenheit.
C: Do you have a cough?
H: Yes.
C: Looks like you have a cold.

Problem-resolution flow pattern includes a conversation that walks human through how to fix a problem, after performing a diagnosis. Handling this type of dialog may include determining instructions for fixing common issues, and refining the conversational agent so humans have success with it. Also, as in diagnosis, this may involve backtracking. The following illustrates an example of a problem-resolution flow pattern in technology trouble-shooting use case.
C: Turn on the projector and connect your video cable.
H: Okay, it is on, but not showing my display!
C: Hit Fn-F7 on your laptop.
H: Good, now I can see my display. Thanks!

Query-formulation flow pattern includes query information in a database or knowledge base. This pattern may be meta-data specific: human utterances mention pieces of the database schema. Handling this type of dialog may include enforcing valid queries. If the human refines the query over the course of the dialog, they tend to use anaphora and ellipsis. The following illustrates an example of query-formulation flow pattern in census use case.
H: What was the median salary for working women in the US in 2009?
C: The median weekly earnings for women in 2009 was 657 US$.
H: Give me that number per race and ethnicity.
C: Here are the corresponding numbers: [ . . . ]

The following describes add-on flow patterns.
Anaphora and ellipsis flow pattern: In linguistics, an anaphora is a reference, for instance, "it" or "that number". An ellipsis is an omitted clause understood from context.
Repair flow pattern: Repair describes how parties in a conversation deal with problems in speaking, hearing, or understanding.
Disambiguation flow pattern: Agree upon one among alternative meanings of a word or phrase.
Elaboration flow pattern: Let the human obtain more information on the same topic.
Stopping a discussion flow pattern: Let the human interrupt a conversation or a sub-dialog.
Digression flow pattern: Allow the human to take the conversation to a different, unrelated topic. Resume prior topic afterwards.
Interleaved dialogs flow pattern: Conduct one or more dialogs concurrently.

Coherence-Flexibility Dilemma

A dialog has coherence if its participants have common ground, i.e., they are talking about the same thing and understanding each other correctly. Coherence is needed to reach the desired outcome of the dialog. In computer processing of the natural language, when coherence is put at risk during a dialog session with the computer, the add-on flow patterns, repair and disambiguation, may be utilized to resolve coherence risk.

A dialog has flexibility if its participants have both perceived and real control over it. If the dialog has too little flexibility, humans find it difficult to use, since they have to learn its "machine-speak". Furthermore, humans may get frustrated and seek alternative communication channels. Flexibility relates to the add-on flow patterns elaboration, stopping a discussion, and digression. The coherence-flexibility dilemma is that these two goals are diametrically opposed. It is easy to accomplish one while ignoring the other. But techniques that improve coherence reduce flexibility and vice versa.

In one embodiment of the present disclosure, the programming model including grammars allow for both coherence and flexibility. The programming model, for example, may incorporate a backward-looking confirmation of the previous utterance, and a forward-looking question or statement advancing the conversation. Consider for example the dialog shown above in Example Dialog 2, in which the computer says "Okay, medium. What crust?". The computer attempts an implicit confirmation of what it understood (backward-looking) and asks the next question (forward-looking). The human corrects the computer. Next, the computer rephrases the question for the size by explicitly listing the choices, thus sacrificing some flexibility to improve coherence. After the human picks an option, the computer conducts a more explicit confirmation before continuing with the conversation.

Figure 6:
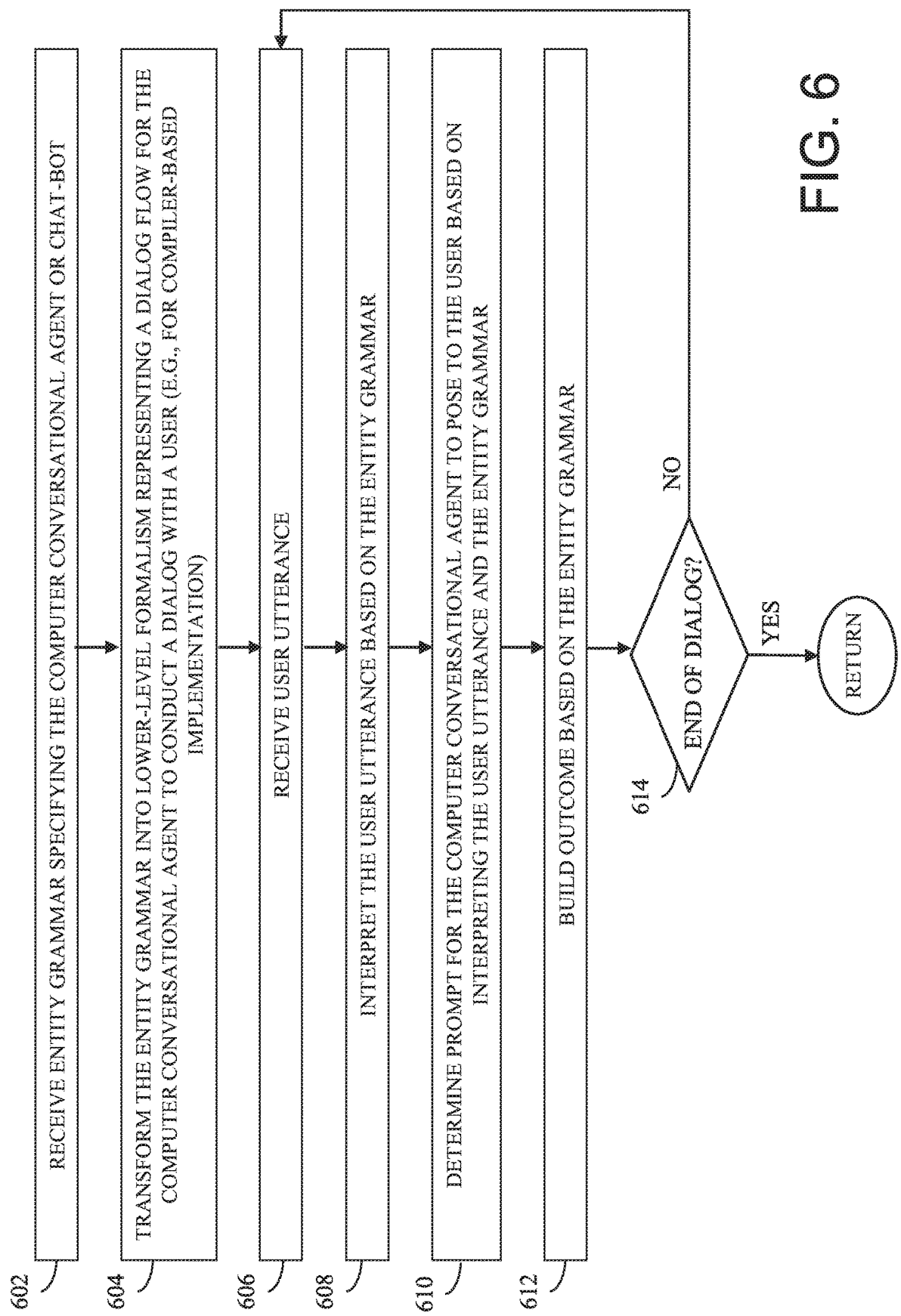
FIG. 6 is a flow diagram illustrating a method of providing a computer conversational agent or chat-bot and outcome in one embodiment of the present invention.

FIG. 6 is a flow diagram illustrating a method of providing a computer conversational agent or chat-bot and outcome in one embodiment of the present disclosure. The method may be executed by or performed by one or more hardware processors. At 602, an entity grammar specifying the computer conversational agent may be received, for example, by a hardware processor. The entity grammar may include rules that define compound entities in terms of tokens, choice, and product. The computer conversational agent may conduct a dialog with a user according to the entity grammar. An authoring user may specify or input the entity grammar. In one aspect, the entity grammar may contain assertions and actions.

At 604, in one embodiment, the hardware processor may transform the entity grammar into a lower-level formalism (e.g., in a compiler-based embodiment). The lower-level formalism represents a dialog flow for the computer conversational agent or chat-bot to execute to conduct a dialog with a user.

At 606, user utterance may be received and at 608, the user utterance may be interpreted based on the entity grammar.

At 610, a prompt for the computer conversational agent to pose to the user may be determined based on interpreting the user utterance and the entity grammar. The prompt is transformed to speech and output to the user, for example, the computer conversational agent utters the prompt.

At 612, outcome may be built by storing one or more words in the user utterance and the prompt that match the tokens in the entity grammar.

The dialog process may continue until the dialog ends, for example, shown at 614. For example, the receiving of user utterance at 606, the determining of a prompt at 108 and uttering of the prompt and the building of the outcome at 610 may be iterated until the dialog ends. The end of the dialog may be determined based on the grammar. The outcome data structure that is complete and fully confirmed indicates to the computer that the dialog has ended. For instance, the computer detects that the outcome data structure is complete and fully confirmed, and thus the dialog ended.

The outcome may be stored in a data structure as specified in the entity grammar. Thus, the entity grammar in the present disclosure specifies both the dialog flow and data structure of the outcome.

In one embodiment, the actions are executed to actuate one or more services. The actions may be actuated based on the outcome. In one aspect, a finite state machine is provided that keeps track of the state of each piece of the outcome. The finite state machine may include entity states of undefined, filled, confirmed and rejected, for example, which apply to pieces of the outcome. The finite state machine in one embodiment governs the progress of the conversation.

Figure 7:
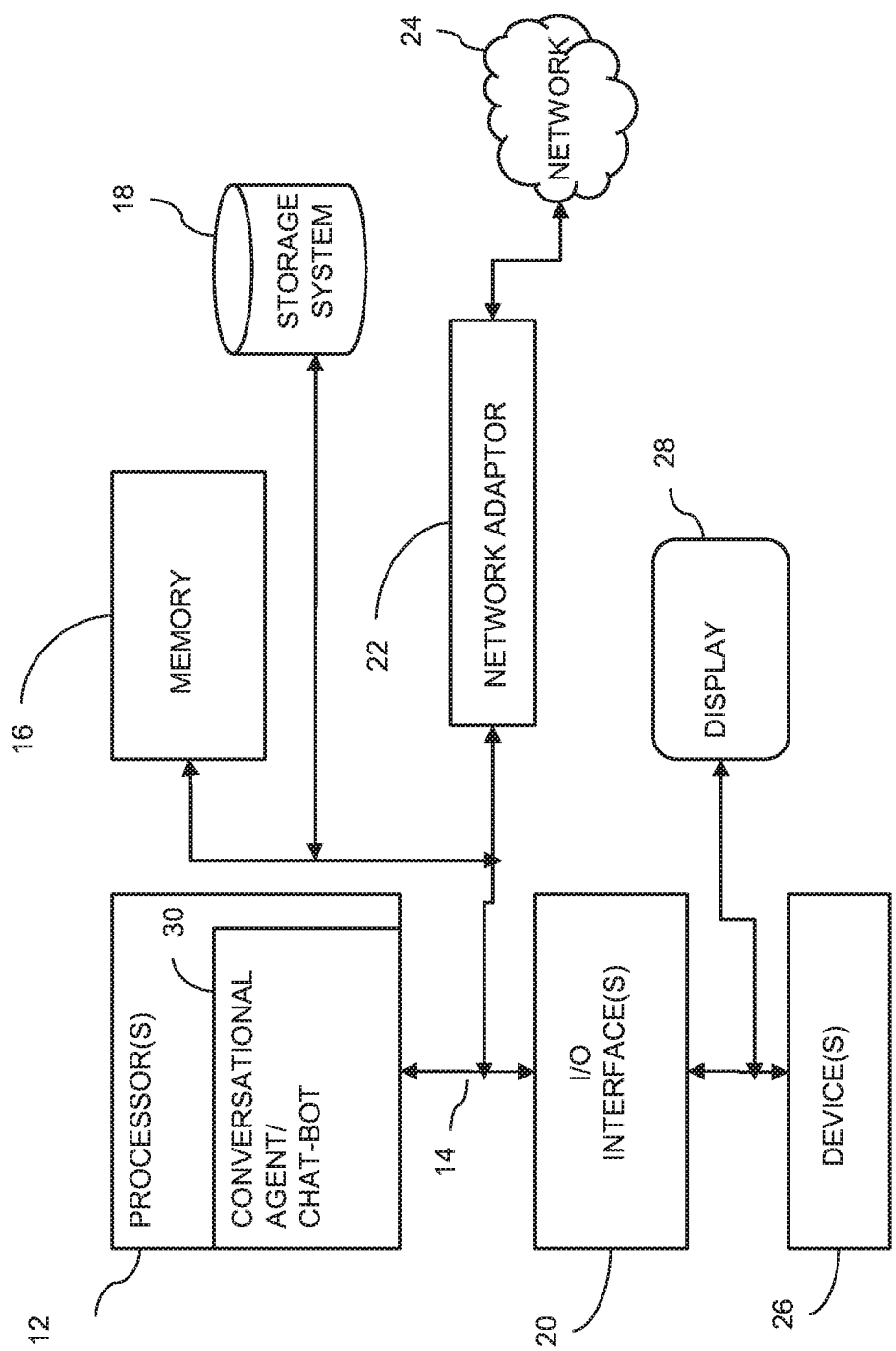
FIG. 7 illustrates a schematic of an example computer or processing system that may implement a conversational agent or chat-bot system in one embodiment of the present invention.

FIG. 7 illustrates a schematic of an example computer or processing system that may implement a conversational agent or chat-bot system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a chat-bot module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of providing a computer conversational agent and outcome, the method performed by at least one hardware processor, the method comprising:
receiving an entity grammar specifying the computer conversational agent, the entity grammar including at least rules that define compound entities in terms of tokens, choice, and product and according to which the computer conversational agent is to conduct a dialog with a user, the entity grammar represented by at least non-terminals and repetitions, the entity grammar being a domain-specific programming language that programs the computer conversational agent;
translating the entity grammar into types;
receiving user utterance;

interpreting the user utterance based on the entity grammar;

determining a prompt for the computer conversational agent to pose to the user based on interpreting the user utterance and the entity grammar;

uttering the prompt to the user;

building the outcome by storing words in the user utterance and the prompt that match the tokens in the entity grammar; and repeating the receiving of user utterance, the determining of a prompt, the uttering of the prompt and the building of the outcome until the dialog ends, the end of the dialog determined based on the grammar, wherein the entity grammar specifies both a dialog flow of the dialog and data structure of the outcome, wherein the built outcome is rendered in data-interchange format and the entity grammar can serve a dual role of specifying the dialog flow of the computer conversational agent and validating the built outcome, wherein the types translated from the entity grammar validate the outcome rendered in data-interchange format.

2. The method of claim 1, wherein the authoring user is allowed to specify the computer conversational agent via the entity grammar.

3. The method of claim 1, wherein the entity grammar contains assertions and actions.

4. The method of claim 3, wherein the actions are executed to actuate a service.

5. The method of claim 4, wherein the actions are actuated based on the outcome.

6. The method of claim 1, further comprising providing a finite state machine that governs the progress of the dialog.

7. The method of claim 6, wherein the finite state machine includes at least entity states of undefined, filled, confirmed and rejected, which apply to pieces of the outcome.

8. A computer program product for providing a computer conversational agent and outcome, the computer program product comprising a computer readable storage medium having program instructions embodied therewith, wherein the computer readable storage medium is not a transitory signal per se, the program instructions readable by a processor to cause the processor to perform a method comprising:

receiving an entity grammar specifying the computer conversational agent, the entity grammar including at least rules that define compound entities in terms of tokens, choice, and product and according to which the computer conversational agent is to conduct a dialog with a user, the entity grammar represented by at least non-terminals and repetitions, the entity grammar being a domain-specific programming language that programs the computer conversational agent;

translating the entity grammar into types;

receiving user utterance;

interpreting the user utterance based on the entity grammar;

determining a prompt for the computer conversational agent to pose to the user based on interpreting the user utterance and the entity grammar;

uttering the prompt to the user;

building the outcome by storing words in the user utterance and the prompt that match the tokens in the entity grammar; and repeating the receiving of user utterance, the determining of a prompt, the uttering of the prompt and the building of the outcome until the dialog ends, the end of the dialog determined based on the grammar, wherein the entity grammar specifies both a dialog flow of the dialog and data structure of the outcome, wherein the built outcome is rendered in data-interchange format and the entity grammar can serve a dual role of specifying the dialog flow of the computer conversational agent and validating the built outcome, wherein the types translated from the entity grammar validate the outcome rendered in data-interchange format.

9. The computer program product of claim 8, wherein the authoring user is allowed to specify the computer conversational agent via the entity grammar.

10. The computer program product of claim 8, wherein the entity grammar contains assertions and actions.

11. The computer program product of claim 10, wherein the actions are executed to actuate a service.

12. The computer program product of claim 11, wherein the actions are actuated based on the outcome.

13. The computer program product of claim 8, further comprising providing a finite state machine that governs the progress of the dialog.

14. The computer program product of claim 13, wherein the finite state machine includes at least entity states of undefined, filled, confirmed and rejected, which apply to pieces of the outcome.

15. A computer conversational agent system, comprising:

a memory device; and at least one hardware processor coupled to the memory device and receiving an entity grammar specifying the computer conversational agent, the entity grammar including at least rules that define compound entities in terms of tokens, choice, and product, and according to which the computer conversational agent is to conduct a dialog with a user, the entity grammar represented by at least non-terminals and repetitions, the entity grammar being a domain-specific programming language that programs the computer conversational agent;

the at least one hardware processor translating the entity grammar into types;

the at least one hardware processor receiving user utterance;

the at least one hardware processor interpreting the user utterance based on the entity grammar;

the at least one hardware processor determining a prompt for the computer conversational agent to pose to the user based on interpreting the user utterance and the entity grammar;

the at least one hardware processor uttering the prompt to the user;

the at least one hardware processor building a dialog outcome by storing on the memory device, words in the user utterance and the prompt that match the tokens in the entity grammar;

the at least one hardware processor repeating the receiving of user utterance, the determining of a prompt, the uttering of the prompt and the building of the dialog outcome until the dialog ends, the end of the dialog determined based on the grammar, wherein the entity grammar specifies both a dialog flow of the dialog and data structure of the dialog outcome, wherein the built outcome is rendered in data-interchange format and the entity grammar can serve a dual role of specifying the dialog flow of the computer conversational agent and validating the built outcome, wherein the types translated from the entity grammar validate the outcome rendered in data-interchange format.

16. The system of claim 15, wherein the authoring user is allowed to specify the computer conversational agent via the entity grammar.

17. The system of claim 15, wherein the entity grammar contains assertions and actions.

18. The system of claim 17, wherein the actions are executed to actuate a service.

19. The system of claim 18, wherein the actions are actuated based on the dialog outcome.

20. The system of claim 15, further comprising providing a finite state machine that governs the progress of the dialog, wherein the finite state machine includes at least entity states of undefined, filled, confirmed and rejected, which apply to pieces of the dialog outcome.

* * * * *